H. T. KRAKAU.
ENGINE CONNECTION.
APPLICATION FILED SEPT. 17, 1915.
1,304,577.
Patented May 27, 1919.
5 SHEETS—SHEET 1.
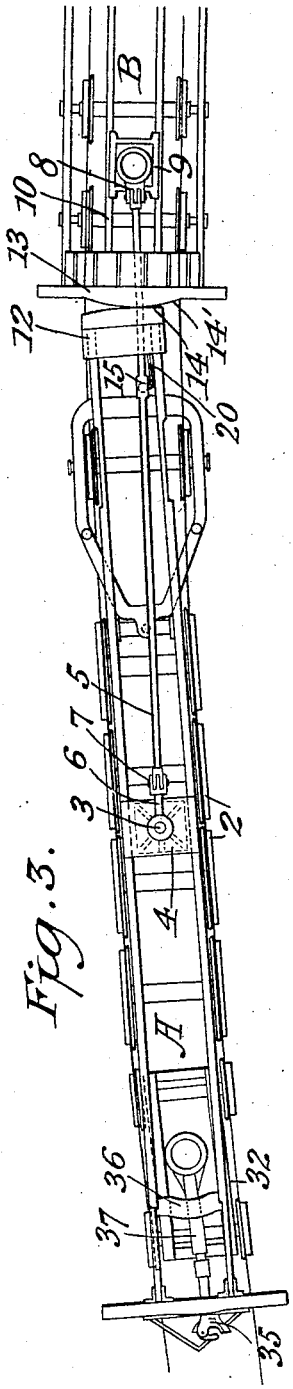
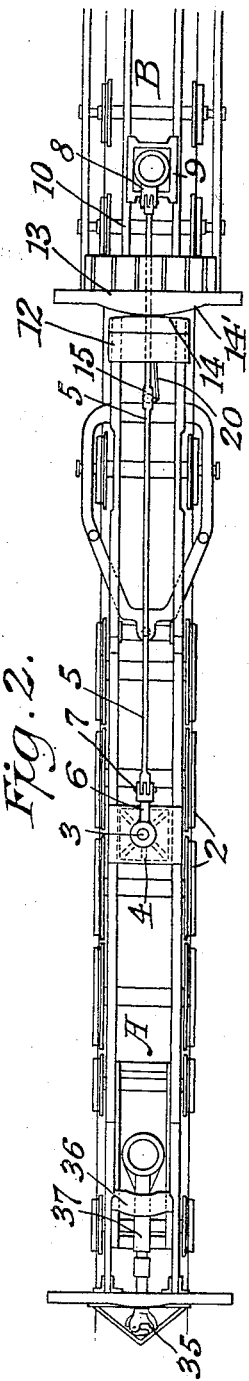
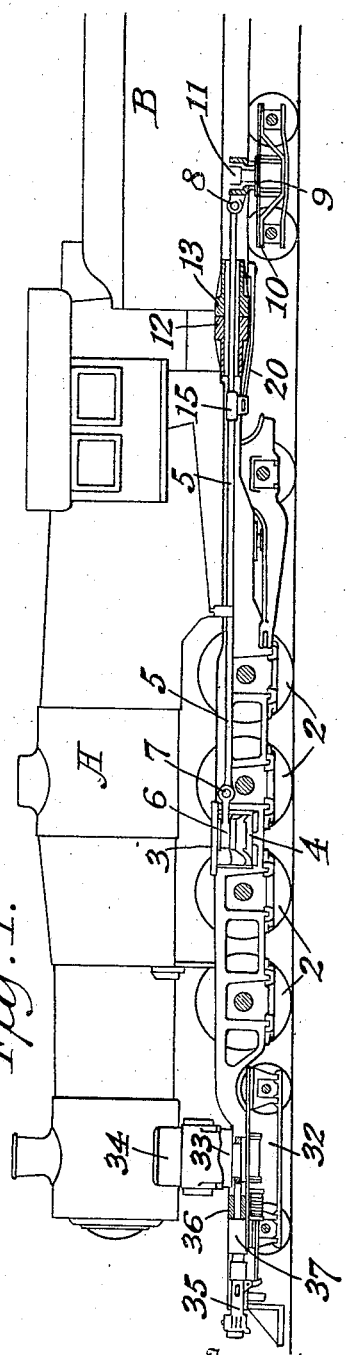
Inventor
Harry T. Krakau
By his Attorney

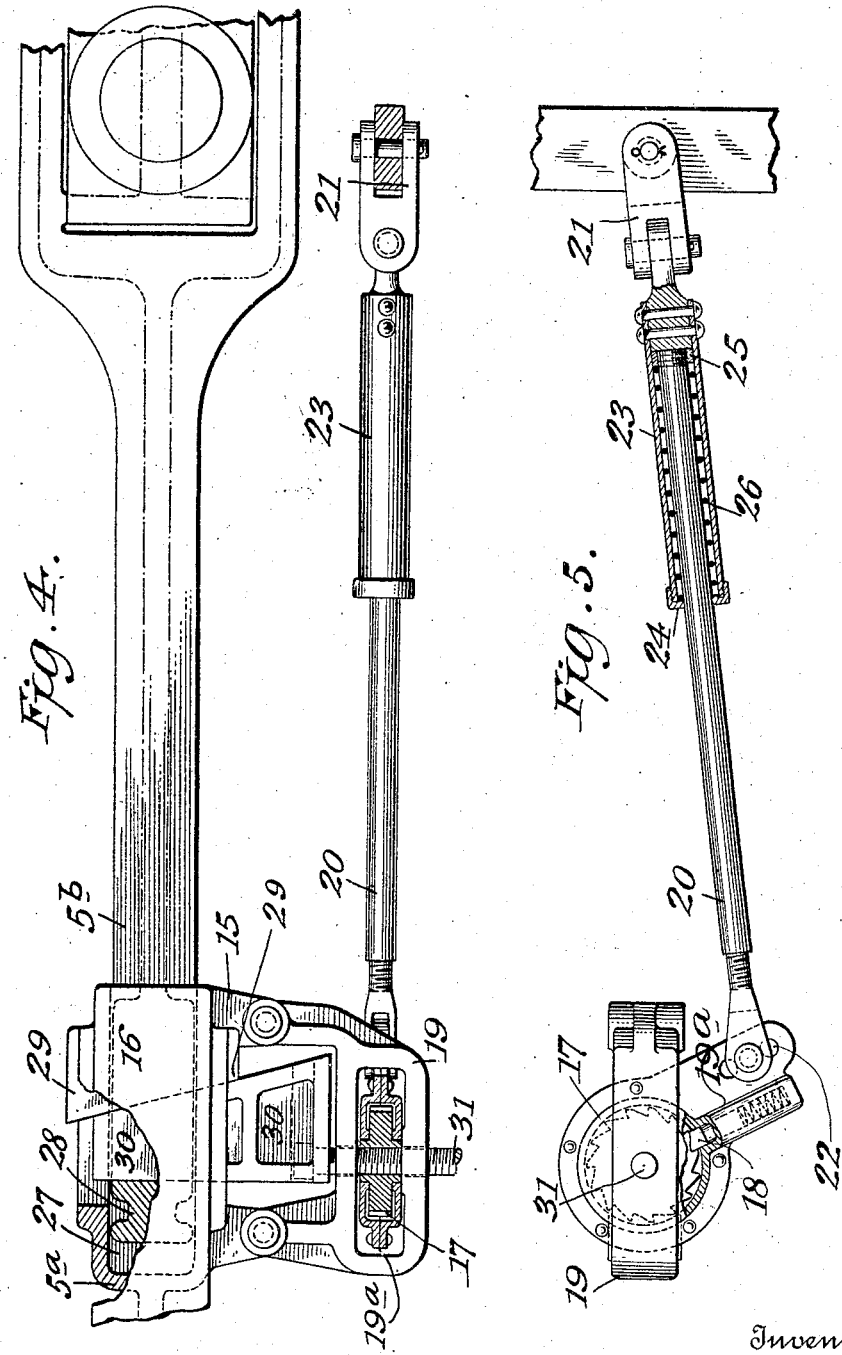

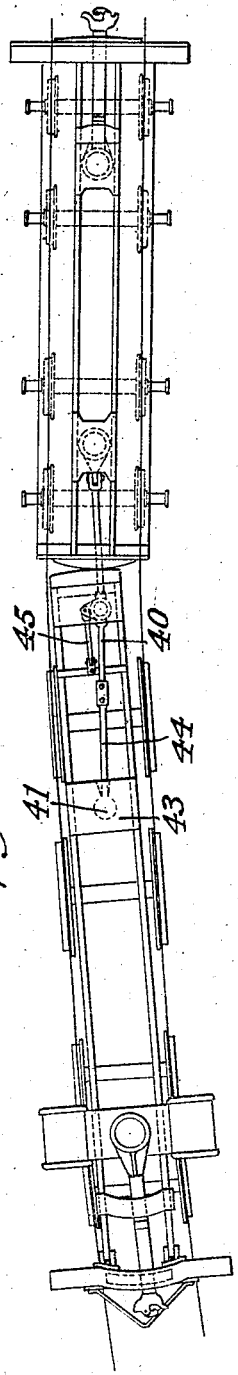
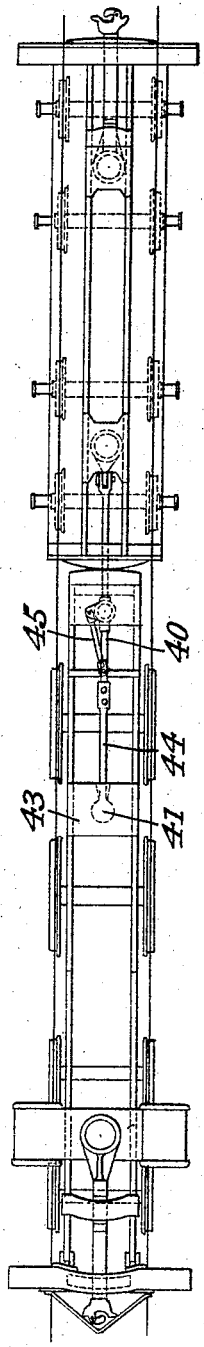
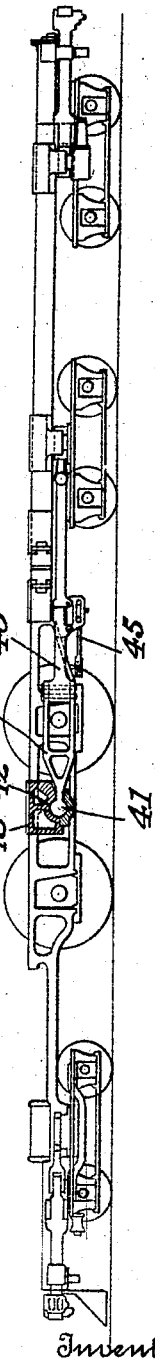

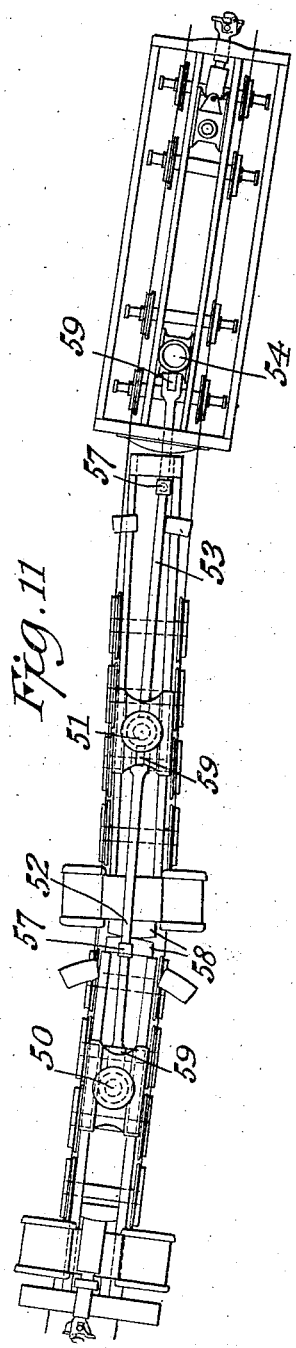
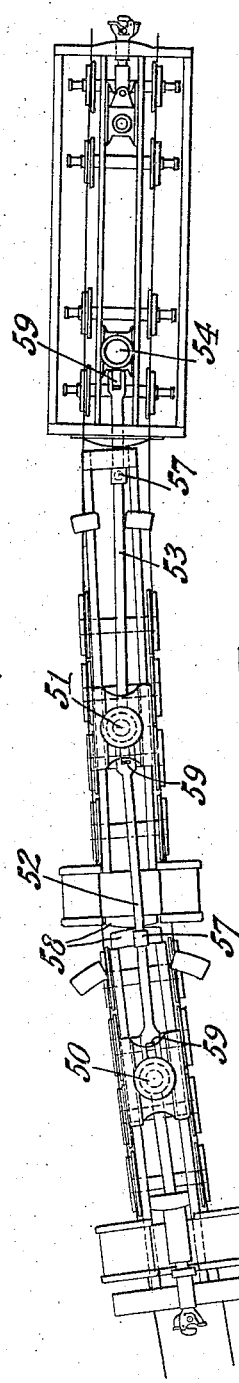
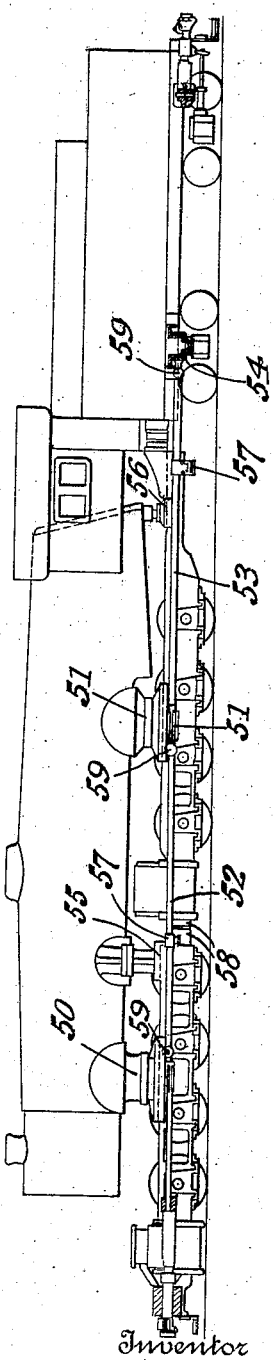

H. T. KRAKAU.
ENGINE CONNECTION.
APPLICATION FILED SEPT. 17, 1915.

1,304,577.

Patented May 27, 1919.
5 SHEETS—SHEET 5.

Inventor
Harry T. Krakau
By his Attorney

UNITED STATES PATENT OFFICE.

HARRY T. KRAKAU, OF CLEVELAND, OHIO.

ENGINE CONNECTION.

1,304,577.  Specification of Letters Patent.  Patented May 27, 1919.

Application filed September 17, 1915. Serial No. 51,133.

*To all whom it may concern:*

Be it known that I, HARRY T. KRAKAU, a citizen of the United States, and a resident of Cleveland, Cuyahoga county, Ohio, have invented new and useful Improvements in Engine Connections, of which the following is a specification, reference being had to the accompanying drawings, in which—

Figure 13:
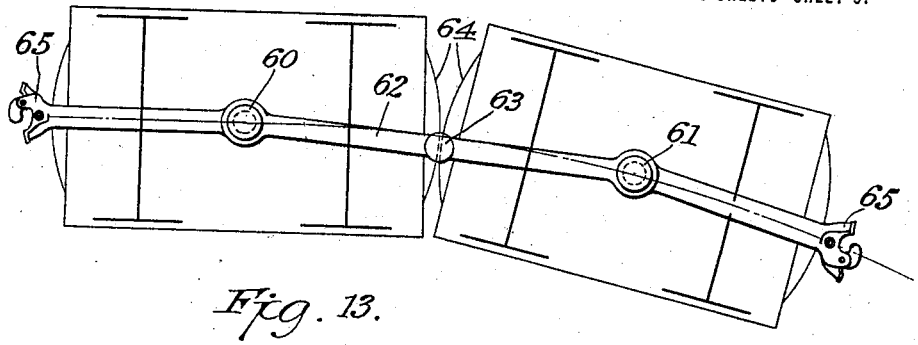
Figure 12:
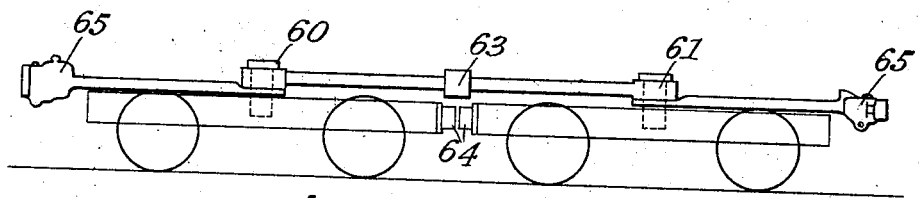
Figure 15:
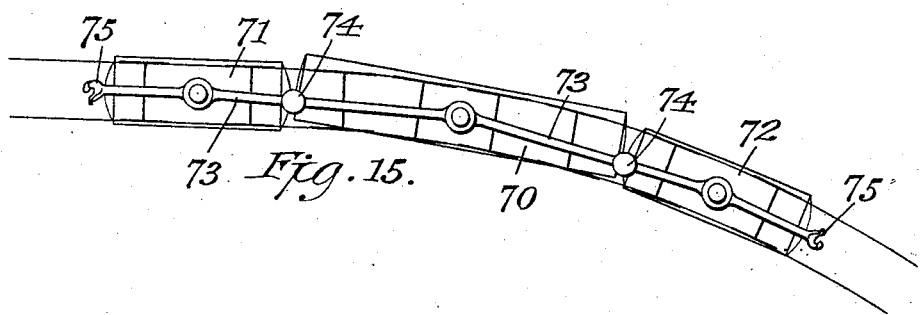
Figure 14:
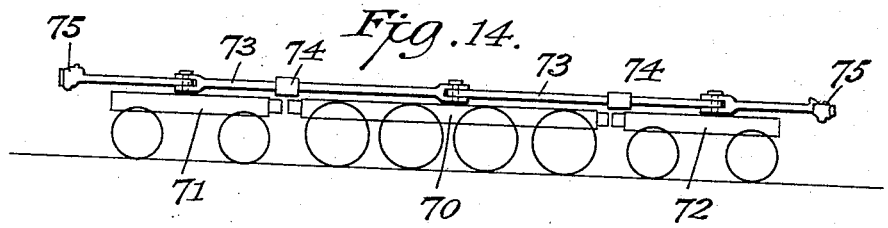

Figure 1 is an elevation partly in section of a Pacific type of locomotive equipped in accordance with my invention; Fig. 2 is a plan showing the trucks of the engine and tender thereof; Fig. 3 is a plan similar to Fig. 2, but showing the trucks on a curved track; Fig. 4 is an elevation of the slack adjusting mechanism for taking up slack in the connection between the engine and tender; Fig. 5 is a bottom plan thereof, partly in section; Fig. 6 is an elevation showing my invention applied to an American type of locomotive; Fig. 7 is a plan thereof, showing the trucks on a straight track; Fig. 8 is a plan thereof similar to Fig. 7, but showing the trucks on a curved track; Fig. 9 is an elevation of a locomotive of the Mallet type, equipped in accordance with my invention; Fig. 10 is a plan thereof showing the trucks on a curved track; Fig. 11 is a plan thereof similar to Fig. 10 but showing the trucks on a reverse curve; Fig. 12 is an elevation showing my invention applied to the trucks of an electric locomotive; Fig. 13 is a plan thereof; Fig. 14 is an elevation showing a further modified form, and Fig. 15 is a plan thereof.

My invention relates to engine connections, and consists in the providing for laterally and vertically flexible connections between the different sections of an engine and between an engine and a tender, and is for the purpose of transmitting draft strains from the centers of motion in a horizontal plane of the various sections of the locomotive, thereby eliminating the excessive strains to which the frames of locomotives are normally subjected when passing around curves. As locomotives are now constructed the draft attachments are secured to substantially the end of the frame of each section so that when, in passing around curves, the end swings out to one side of the center of the track, very great strains are imposed upon the engine frame with resultant damage both to the connection and to the frame of the engine itself, and also to the driving wheels and the trackway. The particular object of my invention is to apply the draft connections in such a way that the frame and various parts of the locomotive will be relieved of the usual strains to which they are subjected and will be free to swing out to one side or the other of the trackway unrestrained by the draft member. To this end I apply the connections substantially at the pivotal centers of motion in a horizontal plane of the various parts of the locomotive and tender so that when under draft the strain will be taken up and transmitted from the center of pivotal motion in a horizontal plane of each part. Where the Mallet type of engine is used, the draft connections are likewise applied at the center of motion of each engine, so that the overhanging ends of each engine will be free to swing out on the curves of the trackway without strain. My invention also consists in the construction and coöperation of parts which I shall hereinafter describe and claim.

Referring to the drawings, and particularly to Figs. 1 to 5 thereof, in which I have shown a Pacific type of locomotive, A indicates the engine and B the tender. The numeral 2 indicates the driving wheels, and 3 indicates that point in the locomotive frame which is the pivotal center of motion in a horizontal plane of the driving wheels. At the center 3 I have shown a pivot casting 4, to which the forward end of the shackle bar or draft rod 5 is connected by the eye-bar 6, which at its forward end takes about the vertically extending pivot column of the casting 4 and at its rearward end is secured to the shackle bar 5 by a horizontally extending pivot 7 thereby permitting both lateral and vertical movement between the engine and tender. The shackle bar 5, at its rear end, is attached for vertical movement to the tender B by another eye-bar 8, which is pivoted for lateral movement in the casting 9. The casting 9 is mounted at the center of the forward truck 10 of the tender B and rotates about a vertically extending pin 11, which also forms the pivot for the truck 10.

At the rear end of the engine A is a buffer 12, and at the forward end of the tender B is a buffer 13, which have oppositely disposed convex buffing faces 14, 14', apertured longitudinally for reception of the shackle bar 5. The arc of the engine buffer 12 is struck from the center 3 of the engine A, and the arc of the tender buffer 13 is struck from the center of the forward truck 10 of the tender B.

To automatically take up the slack between the engine A and the tender B, I have provided a slack adjuster 15, particularly shown in Figs. 4 and 5, preferably mounted on the shackle bar 5, and having an operative connection with either engine or tender, but preferably connected to the tender. The slack adjuster consists in a frame 16 mounted on the shackle bar 5, and having a ratchet 17 and a coöperating spring-pressed pawl 18. Depending from the frame 16 is a member 19 which supports the ratchet and pawl carrying case 19$^a$. Secured to the case 19$^a$ is a rod 20, which may be connected to the engine or tender, but preferably to the tender at its longitudinal center line, by a pivotal member 21. The forward end of the rod 20 is pivotally connected to the case 19$^a$, in one of the apertures 22, of which I have shown a number to permit adjustment of the rod 20 relative to the ratchet inclosing case 19$^a$. In order to provide a flexible connection between the ratchet inclosing member and the tender B, I have provided the rod 20 with a sleeve 23, which encircles the rear end of the rod and is provided at its forward end with an abutment 24. The rear end of the rod terminates in an annular shoulder 25, and between the abutment 24 and the shoulder 25 is a spring 26, which permits the rod to slide forwardly in the sleeve 23 in case strain is imposed upon it, the spring 26 serving to maintain the rod normally in its rearmost position bearing against the rear abutment in the sleeve.

I have shown in Fig. 4 the shackle bar 5 as preferably being comprised of two parts 5$^a$ and 5$^b$, the portion 5$^a$ being attached by the eye-bar 6 to the center 3 of the locomotive, and the portion 5$^b$ being attached by the eye-bar 8 to the center of the forward truck on the tender, and being connected at their adjacent ends by a slot and projection engagement. The portion 5$^a$ is recessed at 27 to receive the forward projection 28 of the portion 5$^b$. Coöperating with the inclined wedging faces 29 of the portion 5$^a$ is a wedge 30 which seats in apertures through both portions 5$^a$ and 5$^b$ of the bar 5. The wedge 30 is actuated by a threaded bolt 31 upon which the ratchet 17 is mounted. If there is sufficient slack between the parts 5$^a$ and 5$^b$, as the engine and tender move apart the rod 20 will rotate the casing 19$^a$ and thereby move the pawl 18 rearwardly, so that it will engage another tooth in the ratchet wheel in advance of the one with which it has been in engagement, and then as the engine and tender subsequently move together, the ratchet 17 will be rotated and will press the wedge 30 upwardly because of its threaded engagement with the bolt 31. This will move the part 5$^b$ forwardly, and will thus automatically take up the slack between the parts 5$^a$ and 5$^b$ of the shackle bar.

I have shown the pilot truck 32 pivoted at its center to the center plate 33 of the cylindrical saddle 34, and a coupler 35 pivotally mounted to the pilot truck center with truck connections for automatically guiding it to the center of the track. I have also made provision for taking up the buffing stresses directly on the frame by providing buffing segments 36 on the frame, which engage the rear face of the shock absorbing mechanism 37.

As will be seen from Fig. 3 the draft strains are transmitted by the shackle bar 5 direct from the center 3 of pivotal motion in a horizontal plane of the driving truck to the center of pivotal motion of the forward truck of the tender, and these two trucks are free to follow the curves of the track without imposing any additional strain upon the frame of the engine. It will also be seen that as the trucks are free to follow the track, both trucks and trackway will be relieved of the abnormal strains imposed upon them by the leverage exerted by the frame of an engine built in accordance with the present-day practice. Particularly in heavy freight service the force exerted on the engine frame by the repeated rounding of curves almost invariably results in racking the frame to such an extent that the cost of maintenance of engines and the trackway is excessive.

In Figs. 6, 7 and 8 I have shown my invention applied to an American type of locomotive, in which the center of pivotal motion is between the two pairs of drivers, and the forward portion of the shackle bar 40 terminates in a ball joint 41, which seats in a socket 42 in the pivot casting 43. The forward portion 44 of the shackle bar 40 is bifurcated, one arm passing above and one below the axle of the rear pair of driving wheels, and is attached to the shackle bar proper by suitable securing means such as bolts or rivets. I have also shown in this modification, the slack adjuster 45 secured to the engine instead of to the tender.

In Figs. 9, 10 and 11 I have shown my invention applied to a Mallet locomotive, the center of pivotal motion in a horizontal plane of the forward engine being indicated by the numeral 50 and the center of the rear engine being indicated by the numeral 51. A draft rod or shackle bar 52 transmits the stresses from the center 50 to the center 51, and a draft rod 53 transmits the draft stresses from the center 51 of the rear engine to the center 54 of the forward truck of the tender. Intermediate supports for the engines having sliding connections with the trucks are indicated at 55 and 56. Each shackle bar 52 and 53 intermediate of its ends carries a slack adjuster 57. Each driving truck also preferably carries buffing segments 58, intended to take up the buffing stresses. The buffing faces of the segments 58 are convex, being curved about the pivotal axis of each of the driving trucks. The forward truck carries the coupler pivotally attached to its center at 50. Each of the shackle bars, in addition to being able to swing horizontally above the truck centers, has also a horizontal joint 59, which permits a certain amount of vertical movement to allow for passing over uneven tracks and vertical curves.

In Figs. 12 and 13 I have shown my invention applied to trucks of an electric locomotive, which are connected at their pivotal centers 60 and 61 by the shackle bar connection 62 having a slack adjuster 63. Between the trucks are the curved buffing blocks or segments 64, each being curved about the center of its respective truck. Also secured to the truck centers are the coupler shanks or draft members 65.

In Figs. 14 and 15 I have shown another type of electric locomotive, having a main truck 70, equipped with four pairs of drivers and two trailer trucks 71, 72. The driver truck 70 is connected to the trailers by means of shackle bars 73, attached pivotally to the center of each truck, and each carrying a slack adjuster 74. A coupler or draft member 75 is pivoted to the center of each trailer truck.

The terms and expressions which I have employed are used as terms of description and not of limitation, and I have no intention, in the use of such terms and expressions, of excluding any mechanical equivalents for the features shown and described, but recognize that various structural modifications are possible within the scope of the invention claimed.

In the claims, wherein I mention an "engine" or "engine unit", I intend that the term shall describe either a tender or an engine or a portion or unit of an engine, as distinguished from the trucks upon which such parts are mounted.

What I claim is:

1. In engine connections, a draft member consisting of two parts, one part being pivotally secured to an engine frame at the center of horizontal pivotal motion of an engine truck, and a slack adjuster attached to the draft member operated by a connection with said truck to take up slack between the parts.

2. In engine connections, a driver truck, a draft member permanently pivoted at one end at the center of motion in a horizontal plane of said truck and secured at its other end at the center of motion of a succeeding truck, said member being mounted for lateral and vertical movement between the two trucks.

3. In engine connections, a driver truck, a draft member permanently pivoted at one end at the center of motion thereof, and secured at its other end at the center of motion of a succeeding truck, said member consisting of two parts, and a slack adjuster secured to one of the trucks and mounted on the draft member adapted to take up slack between the parts of the draft member and between the draft member and a truck.

4. In engine connections, a driver truck, a draft member permanently pivoted at one of its ends at the center of motion thereof, and secured at its other end at the center of motion of a succeeding truck, said member consisting of two parts, said parts having a slot and projection engagement, and a slack adjuster connected to one of the trucks and mounted on one of said parts of the draft member and being adapted to move one of said parts relative to the other to take up slack between the parts of the draft member and between draft member and truck.

5. In engine connections, a plurality of engine units and trucks therefor, and a draft member permanently connecting adjacent units, the draft member having a universal connection with one of said units at the axis of pivotal motion in a horizontal plane of one of said trucks and being connected to an adjacent engine unit at the axis of pivotal motion in a horizontal plane of another of said trucks, said draft member being adapted at its middle portion to swing laterally to one side of the center of the trackway on curves and being held at all times substantially in the center of the trackway at its ends, the frame of each engine unit being free at its ends to swing out laterally over the trackway without restraint from the draft member.

6. In engine connections, a driver truck, a draft member comprised of two parts, one part being permanently pivoted at one of its ends to the center of motion of said truck, and the other part being secured at its opposite end to the center of motion of an adjacent truck, a slack adjuster mounted on said draft member comprising a wedging member mounted between the parts of the draft member, adapted to be actuated by pawl and ratchet mechanism to take up slack between said parts, and a rod secured to a truck adapted to operate the pawl and ratchet mechanism to actuate the wedge.

7. In an engine connection, a draft member pivoted at each of its ends at the center of horizontal motion of two adjacent truck units, said draft member being comprised of two relatively movable parts, each part having a direct connection with a truck unit, and automatic transversely movable means for taking up slack between said parts, said means being actuated by relative longitudinal movement between said truck units.

8. In engine connections a draft member comprising a permanent connection between two adjacent engine units, the draft member being comprised of two parts, each permanently attached at the center of motion in a horizontal plane of an engine unit, the other ends of said parts being capable of longitudinal adjustment relative to each other but being permanently secured together.

9. In engine connections, a driver truck, a draft member permanently pivoted at one end to an engine frame at the center of motion of the driver truck and secured at its other end to another engine frame at the center of motion of an adjacent truck, and a slack-adjuster secured to one of the trucks adapted to take up slack between the trucks.

HARRY T. KRAKAU.

Copies of this patent may be obtained for five cents each, by addressing the "Commissioner of Patents, Washington, D. C."